(12) United States Patent
Umemura et al.

(10) Patent No.: US 10,719,203 B2
(45) Date of Patent: Jul. 21, 2020

(54) RECORDING MEDIUM STORING PROGRAM WITH VERSION UPDATES, INFORMATION PROCESSING DEVICE, DISPLAY METHOD

(71) Applicant: JVC KENWOOD Corporation, Yokohama-shi, Kanagawa (JP)

(72) Inventors: Naoya Umemura, Yokohama (JP); Ichiro Shishido, Yokohama (JP); Kenji Katami, Yokohama (JP)

(73) Assignee: JVC KENWOOD CORPORATION, Yokohama-Shi (JP)

( * ) Notice: Subject to any disclaimer, the term of this patent is extended or adjusted under 35 U.S.C. 154(b) by 43 days.

(21) Appl. No.: 15/993,643

(22) Filed: May 31, 2018

(65) Prior Publication Data

US 2018/0348977 A1 Dec. 6, 2018

(30) Foreign Application Priority Data

May 31, 2017 (JP) .................................. 2017-108086

(51) Int. Cl.
*G06F 3/0484* (2013.01)
*G06F 9/451* (2018.01)
*G06F 3/0482* (2013.01)
*G06F 8/65* (2018.01)

(52) U.S. Cl.
CPC .......... *G06F 3/0484* (2013.01); *G06F 3/0482* (2013.01); *G06F 9/451* (2018.02); *G06F 9/453* (2018.02); *G06F 8/65* (2013.01)

(58) Field of Classification Search
CPC ....... G06F 3/0484; G06F 9/451; G06F 3/0482
See application file for complete search history.

(56) References Cited

U.S. PATENT DOCUMENTS

| | | | |
|---|---|---|---|
| 8,464,148 B1* | 6/2013 | Wichary | G06F 17/2247 715/255 |
| 2004/0080532 A1* | 4/2004 | Cragun | G06F 16/34 715/745 |
| 2013/0167120 A1* | 6/2013 | Amano | G06F 8/71 717/122 |
| 2015/0149916 A1* | 5/2015 | Mendez | G06F 17/2247 715/738 |
| 2016/0034273 A1* | 2/2016 | Leupold | G06F 8/71 717/122 |

FOREIGN PATENT DOCUMENTS

JP 2006-31189 A 2/2006

* cited by examiner

*Primary Examiner* — Li P Sun
(74) *Attorney, Agent, or Firm* — Brundidge & Stanger, P.C.

(57) ABSTRACT

A program is installable in an information processing device. A processor acquires version information for each function provided in a current version of the installed program, the version information indicating that the function is different from a function provided in an older version. A display unit displays a UI element for allowing selection of a function provided in a new version. The display unit displays a UI element corresponding to a function identical to the older version in a first mode and displaying a UI element corresponding to the function different from the older version in a second mode different from the first mode, based on the acquired version information.

10 Claims, 13 Drawing Sheets

FIG.2

| MENU (LEVEL 1) | MENU (LEVEL 2) | ITEM (LEVEL 3) | UPDATE FLAG |
|---|---|---|---|
| FUNCTION-A | FUNCTION 1 | FUNCTION 1-1<br>FUNCTION 1-2 | 0<br>0 |
| | FUNCTION 2 | FUNCTION 2-1<br>FUNCTION 2-2 | 0<br>1 |
| | FUNCTION 3 | FUNCTION 3-1<br>FUNCTION 3-2 | 3<br>0 |
| | FUNCTION 4 | FUNCTION 4-1<br>FUNCTION 4-2 | 2<br>0 |
| | FUNCTION 5 | FUNCTION 5-1<br>FUNCTION 5-2 | 0<br>3 |

| MENU GROUP (LEVEL) | MENU ITEMS | UPDATE FLAG |
|---|---|---|
| FILE (FIRST LEVEL) | SAVE | 0 |
|  | SAVE AS | 0 |
|  | OPEN | 0 |
|  | CLOSE | 0 |
|  | NEW | 0 |
|  | PRINT | 1 |
| EDIT (FIRST LEVEL) | CUT | 3 |
|  | COPY | 0 |
|  | PASTE | 2 |
| ... | ... | ... |
| PRINT (SECOND LEVEL) | PRINT SETTINGS | 0 |
|  | PRINT PREVIEW | 1 |
|  | PRINT SETTINGS | 0 |

| UPDATE FLAG | DISPLAY MODE | CANCELLATION CONDITION |
|---|---|---|
| 1 | A | $\alpha$ |
| 2 | B | $\beta$ |
| 3 | C | $\gamma$ |

| DISPLAY PATTERN | DISPLAY SETTINGS | CHARACTER COLOR | BACKGROUND COLOR |
|---|---|---|---|
| A | ☑ HIGHLIGHTING<br>☐ UNDERLINE<br>☐ ITALIC<br>☑ INCREASED FONT SIZE<br>☐ FLASHING | ☐ BLACK<br>☑ RED<br>☐ BLUE<br>☐ GREEN<br><br>☐ USER DEFINED 1<br>☐ USER DEFINED 2 | ☑ WHITE<br>☐ GRAY<br>☐ THIN RED<br>☐ THIN BLUE<br>☐ THIN GREEN<br>☐ USER DEFINED 1<br>☐ USER DEFINED 2 |
| B | ☑ HIGHLIGHTING<br>☐ UNDERLINE<br>☑ ITALIC<br>☐ INCREASED FONT SIZE<br>☐ FLASHING | ☐ BLACK<br>☐ RED<br>☑ BLUE<br>☐ GREEN<br><br>☐ USER DEFINED 1<br>☐ USER DEFINED 2 | ☐ WHITE<br>☑ GRAY<br>☐ THIN RED<br>☐ THIN BLUE<br>☐ THIN GREEN<br>☐ USER DEFINED 1<br>☐ USER DEFINED 2 |
| C | ☑ HIGHLIGHTING<br>☐ UNDERLINE<br>☐ ITALIC<br>☐ INCREASED FONT SIZE<br>☐ FLASHING | ☐ BLACK<br>☐ RED<br>☐ BLUE<br>☐ GREEN<br><br>☐ USER DEFINED 1<br>☐ USER DEFINED 2 | ☐ WHITE<br>☐ GRAY<br>☐ THIN RED<br>☐ THIN BLUE<br>☐ THIN GREEN<br>☐ USER DEFINED 1<br>☐ USER DEFINED 2 |

| CANCELLATION CONDITION | CANCELLATION SETTINGS | REMARKS |
|---|---|---|
| α | ☐ TO BE CANCELLED<br>☐ NUMBER OF TIMES OF START ____ TIMES<br>☐ NUMBER OF TIMES OF REFERENCE ____ TIMES<br>☐ ELAPSED DAYS ____ DAYS | NO CONDITIONS ARE SET FOR CANCELLATION OF DISTINCTIVE PRESENTATION |
| β | ☑ TO BE CANCELLED<br>☐ NUMBER OF TIMES OF START ____ TIMES<br>☑ NUMBER OF TIMES OF REFERENCE __5__ TIMES<br>☐ ELAPSED DAYS ____ DAYS | DISTINCTIVE PRESENTATION IS CANCELLED WHEN EDIT MENU IS REFERRED TO (DISPLAYED) 5 TIMES |
| γ | ☑ TO BE CANCELLED<br>☑ NUMBER OF TIMES OF START __10__ TIMES<br>☐ NUMBER OF TIMES OF REFERENCE ____ TIMES<br>☐ ELAPSED DAYS ____ DAYS | DISTINCTIVE PRESENTATION IS CANCELED WHEN APPLICATION IS STARTED 10 TIMES |

22

RECORDING MEDIUM STORING PROGRAM WITH VERSION UPDATES, INFORMATION PROCESSING DEVICE, DISPLAY METHOD

CROSS-REFERENCE TO RELATED APPLICATION

This application is based upon and claims the benefit of priority from the prior Japanese Patent Application No. 2017-108086, filed on May 31, 2017, the entire contents of which are incorporated herein by reference.

BACKGROUND

1. Field

The present invention relates to display technology and, more particularly, to a recording medium for recording a program with version updates, information processing device, and display method.

2. Description of the Related Art

An update to a version of a program installed in a computer may result in a change in the User Interface (UI). In one known technology adapted to facilitate the learning of the UI structure in the program of a new version, an interface screen of the program of a new version and an interface screen of the program of an old version are displayed side by side (see, for example, patent document 1).

[patent document 1] JP2006-31189

According to the technology disclosed in patent document 1, a GUI screen of the program of an old version is displayed as a guide window as contrasted with a Graphical User Interface (GUI) screen of the program of a new version. Therefore, it is easy for the user who is used to the GUI structure of the old version to know which function shown in the GUI of the new version corresponds to the function in the GUI of the old version.

According to the technology of patent document 1, however, it is not possible to present a function added or changed in the new version to the user in a manner easy to know. For example, in order for the user to recognize a newly added function according to patent document 1, the user needs to compare the two screens shown in FIG. 4B in detail, study the difference between the functions (function A, function B, function D, function E, function F) displayed in the screen on the left side and the functions (function B, function C, function E) displayed in the screen on the right side, and grasp the functions (function A, function D, function F) found only in the screen on the left side. In other words, the related art requires the user to compare the two screens visually to grasp the difference between the two and cannot present new functions or changed functions in a manner easy to know. In this background, it is desired to make added new functions or changed functions known to the user in a manner easy to know.

SUMMARY

A recording medium according to one embodiment of the present invention is encoded with a program, the program comprising computer-implemented modules including: an acquiring module to acquire version information for each function provided in a current version of the program, the version information indicating whether the function is identical to or different from a function provided in an older version of the program than the current version; a generating module to generate screen data including a UI element for allowing a user to select the function provided in the current version, based on the acquired version information; and a displaying module to display the generated screen data on a display. The screen data generated in the generation module is data for displaying a UI element corresponding to the function identical to the older version in a first display mode and displaying a UI element corresponding to the function different from the older version in a second display mode.

Another embodiment related to an information processing device. An information processing device comprising: a storage that stores a program; an acquisition unit that acquires version information for each function provided in a current version of the stored program, the version information indicating whether the function is identical to or different from a function provided in an older version of the program than the current version; a generation unit that generates screen data including a UI element for allowing a user to select the function provided in the current version, based on the acquired version information; and a display controller that displays the generated screen data on a display. The screen data generated in the generation unit is data for displaying a UI element corresponding to the function identical to the older version in a first display mode and displaying a UI element corresponding to the function different from the older version in a second display mode.

Still another embodiment relates to a display method. The method is implemented by a computer and comprises: acquiring version information for each function provided in a current version of a program stored in the computer, the version information indicating whether the function is identical to or different from a function provided in an older version of the program than the current version; generating screen data including a UI element for allowing a user to select the function provided in the current version, based on the acquired version information; and displaying the generated screen data on a display. The screen data generated in the generating is data for displaying a UI element corresponding to the function identical to the older version in a first display mode and displaying a UI element corresponding to the function different from the older version in a second display mode.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 shows a data structure of a table stored in the version information storage;

FIG. 3 shows a data structure of another table stored in the version information storage;

FIG. 4 shows a data structure of a table stored in the display mode storage;

FIG. 5 shows an input screen for providing the display mode setting displayed on the display unit;

FIG. 9 shows an input screen for configuring cancellation conditions displayed on the display unit;

DETAILED DESCRIPTION

The invention will now be described by reference to the preferred embodiments. This does not intend to limit the scope of the present invention, but to exemplify the invention.

A summary of the prevent invention will be given before describing the invention in specific detail. Embodiments of the present invention relate to programs installed in information processing devices such as PCs, smartphones, and tablets. Various functions are provided in a program. New functions may be added, or functions may be changed by updating the version of a program. It is preferable for users that a screen for selecting a function shows a newly added function and a changed function in a manner easily to know. Meanwhile, it is preferable for providers of the program that users be prompted to actively use or re-realize a newly added function and a changed function. In order to make a newly added function and a changed function known in a screen for selecting a function, the information processing device according to the embodiment performs the following process.

When acquiring a program of a new version (a current version) by, for example, downloading the program, the information processing device also acquires a list of newly added functions and changed functions (hereinafter, referred to as "version information"). For example, the version information accompanies the program of the new version. The information processing device executes the updated program in response to a user operation and displays a screen for selecting a function. When displaying the screen, the information processing device checks the version information and changes the display mode for the newly added function and the changed function from that of the other functions. A display mode for a function is defined as a mode of displaying a UI element related to the function. For example, the display mode is a mode to display a menu, button, text field, check box, etc. related to the function.

Figure 1:
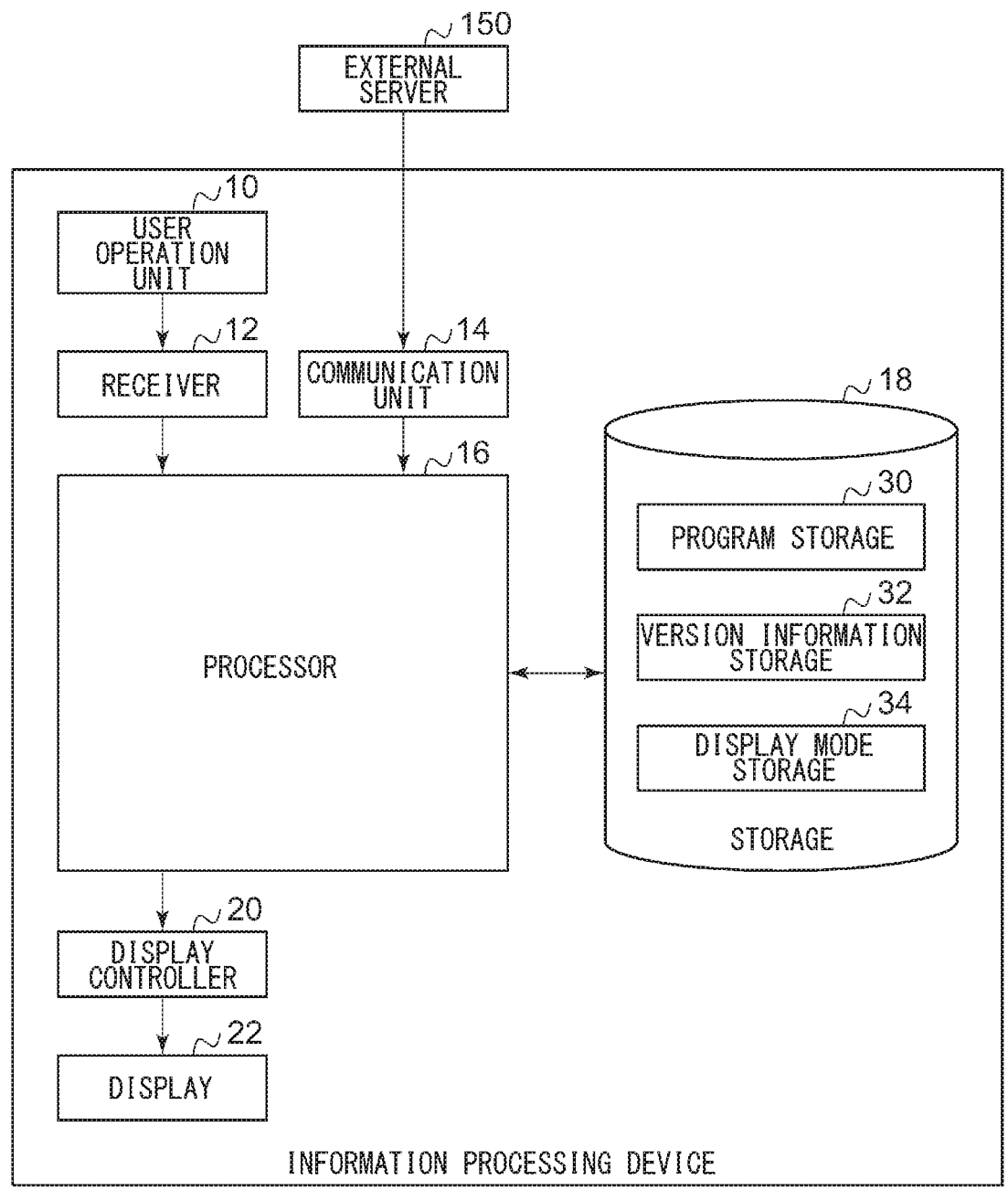
FIG. 1 shows a configuration of an information processing device according to the embodiment.

FIG. 1 shows a configuration of an information processing device 100 according to the embodiment. The information processing device 100 includes a user operation unit 10, a receiver 12, a communication unit 14, a processor 16, a storage 18, a display controller 20, and a display unit 22. The storage 18 includes a program storage 30, a version information storage 32, and a display mode storage 34. The information processing device 100 is connected to an external server 150.

The external server 150 is a device provided outside the information processing device 100, and the information processing device 100 is connected to the external server 150 via a network. The external server 150 stores a program of a new version (a current version) and transmits the program of the new version to the information processing device 100. The external server 150 also transmits the version information to the information processing device 100 to accompany the program of the new version. The version information may be transmitted along with the program of the new version or transmitted separately. The details of the version information will be described later. Thus, the external server 150 provides the program of the new version to the information processing device 100. A plurality of information processing devices 100 may be connected to the external server 150. The program of the new version may be supplied to the information processing device 100 by means other than the external server 150 (e.g., CD-ROM, USB memory, etc.). The program of the new version may be referred to as "new program" hereinafter.

The communication unit 14 performs communication with the external server 150 and receives the new program and the version information. The user operation unit 10 is a user interface controlled by the user. The user operation unit 10 includes, for example, a keyboard, button, mouse, touch panel, etc. The receiver 12 receives a user operation in the user operation unit 10. The user operation unit 10 outputs the received user operation to the processor 16.

The program storage 30 stores a program of a version previous to the version of the new program (a current version). The previous version may be a version one generation before the version of the new program (version immediately before) or a version two generations before. The program of a version previous to the version of the new program may be referred to as an "old program", an "old version" or an "older version" in the following description. The old program can be said to be a program installed in the information processing device 100. Upon receiving a user operation via the user operation unit 10 and the receiver 12, the processor 16 executes the old program stored in the program storage 30. Upon receiving the new program from the communication unit 14, the processor 16 updates the old program to the new program. This represents updating the version of the program. By updating the version of the program, some of the functions provided in the program are changed or added. Upon updating the version of the program, the processor 16 stores the new program in the program storage 30. Consequently, the processor 16 executes the new program stored in the program storage 30 subsequently. The old program may not be stored in the program storage 30. The new program may be stored in the program storage 30 from scratch.

The version information storage 32 stores the version information received from the communication unit 14 via the processor 16. The version information is a list of functions newly added or changed as a result of updating the version. For example, the version information shows update flags (information indicating the type of update) for each function. The update flag may be defined such that "0: no change", "1: added function", "2: changed function", "3: changed name", etc. and shows whether an addition or change is made or details of the addition or change. "1: added function" indicates a function that is not found in the old version, "2: changed function" indicates a function that is correspondingly found in the old version but has changed its details, "3: changed name" indicates a function substantially identically found in the old version except that its name is changed. In other words, the update flag "0" means that the function is identical to the old version. The values other than "0" of the update flag indicates a function different from the old version.

FIG. 2 shows a data structure of a table stored in the version information storage 32. The figure shows version information for a hierarchy of functions. In the illustrated example, the functions are hierarchized in a hierarchical structure including the first hierarchical level, second hierarchical level, and third hierarchical level. The first hierarchical level is the top hierarchical level and the third hierarchical level is the bottom hierarchical level. For example, "function 1"~"function 5" on the second hierarchical level are stored below "function-A" on the first hierarchical level, and "function 1-1" and "function 1-2" on the third hierarchical level are stored below "function 1" on the second hierarchical level. It should be noted here that "function-A", "function 1", and "function 1-2", etc. correspond to functions provided in the program. Further, update flags are indicated for "function 1-1" etc. In this case, "function 2-2" is newly added, "function 4-1" is changed, and "function 3-1" and "function 5-2" change their names. The other functions remain unchanged.

FIG. 3 shows a data structure of another table stored in the version information storage 32 and shows version information for a menu displayed on the display unit 22. In the illustrated menu, menu items lower in the hierarchy are placed below a menu group higher in the hierarchy. For example, "File" is on the first hierarchical level, "Print", etc. are on the second hierarchical level, and "Print Settings", etc. are on the third hierarchical level. The first hierarchical level is the top hierarchical level and the third hierarchical level is the bottom hierarchical level. Further, "Print" is a menu item lower in the hierarchy than "File" and is also a menu group higher in the hierarchy than "Print Settings". Thus, the menu also has a hierarchical structure. "File", "Print", "Print Settings", etc. correspond to functions provided in the program. Further, update flags are indicated for respective menu items. "Added function" is indicated for "Print" and "Print Preview", "changed function" is indicated for "Paste", and "changed name" is indicated for "Cut". No other changes in the settings are indicated. Reference is made back to FIG. 1.

The display mode storage 34 stores the settings of display modes for the update flags. The settings are provided by a user via the user operation unit 10 and the receiver 12 but may be transmitted from the external server 150 along with the version information. FIG. 4 shows a data structure of a table (display mode correspondence information) stored in the display mode storage 34. As shown in the figure, display modes "A", "B", and "C" and cancellation conditions "α", "β", and "γ" are mapped to the update flags "1-3", respectively. A description of cancellation conditions will be given later, and the display modes will be described here. The display mode indicates a mode in which the function as shown in FIGS. 2 and 3 is displayed in a screen in which the user makes a selection. For example, the display mode includes display settings such as highlight (bold), underline, italic, increased size, flashing, character color, and background color. In the display modes A, B, and C, display settings are combined in mutually different combinations. To describe it in further details, FIG. 5 will be used.

FIG. 5 shows an input screen for providing the display mode settings displayed on the display unit 22. In the input screen, a plurality of display settings are arranged for each display mode. The user uses the user operation unit 10 to check a check box mapped to a display setting. Regarding the character color and the background color, the user may select a color from predetermined options or may enter numerical R, G, B values or the like to designate an arbitrary color. In this way, the receiver 12 receives the display settings for each display mode from the user via the user operation unit 10. Initially, the settings for the display modes acquired from the external server 150 along with the version information may be displayed so that the user may modify the settings. The processor 16 selects the received display settings and configures the display mode in accordance with a combination of the selected display settings. For example, the display mode "A" is configured as a combination of highlighting, increased font size, character color "red", and background color "white", and the display mode "B" is configured as a combination of highlighting, italic, character color "blue", and background color "gray". In the display mode "C", the checkboxes for character color and background color are not checked so that the the character color and background color are "regular". In other words, the display mode "C" is configured such that the only difference from the regular mode of display is highlighting. The processor 16 stores the correspondence between the display settings and the display modes in the display mode storage 34.

For functions for which the update flag "0" is set, the settings in FIGS. 4 and 5 are not used. For example, the basic settings (regular mode of display), in which highlighting (bold), underline, italic, increased size, flashing, etc. are not used, are used. The display mode for the function for which the update flag "0" is set, i.e., the function that remains unchanged from the pre-update version is defined as the "first mode". The first mode is alternatively referred to as "normal mode" or "regular mode of display". Meanwhile, the display mode for the function for which any of the update flags "1"~"3" is set, i.e., the function changed or added is defined as the "second mode". The display modes A, B, and C included in the second mode may be defined as the "third mode", "fourth mode", and "fifth mode". Reference is made back to FIG. 1.

Figure 6:
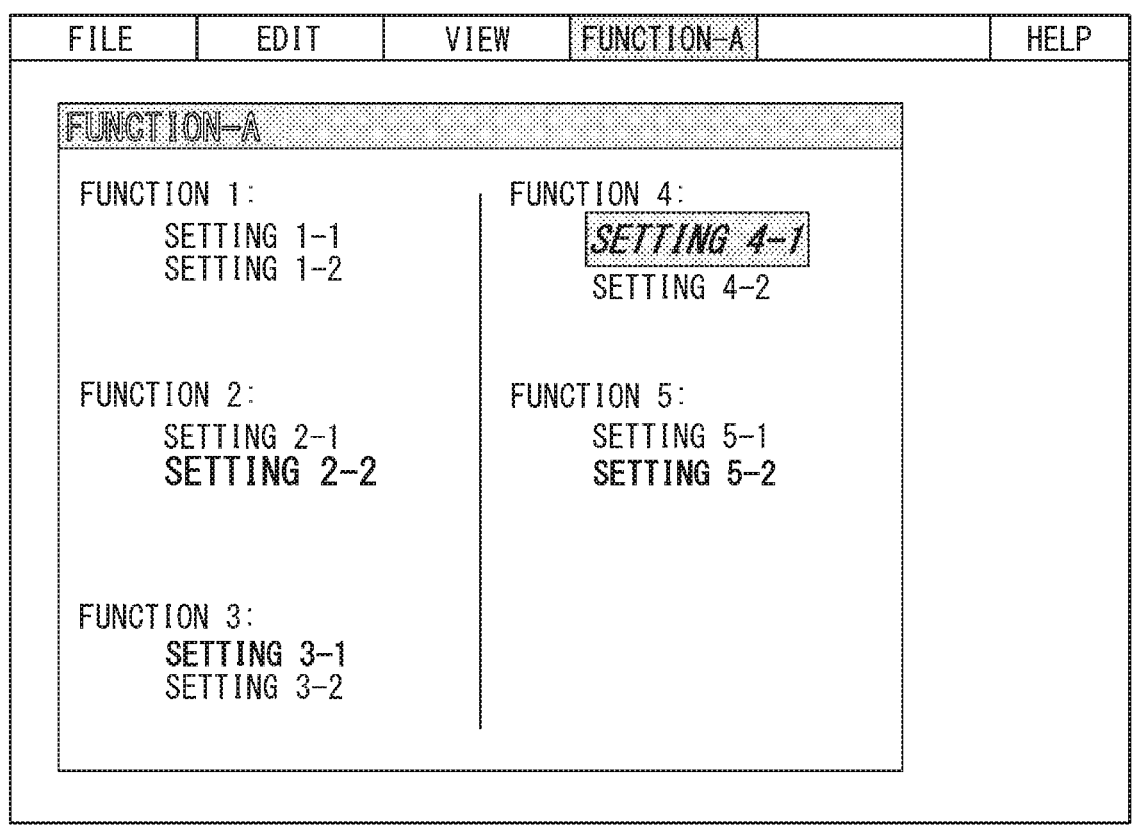
FIG. 6 shows a screen displayed on the display unit.

The processor 16 generates a screen for selecting a function provided in the new program. The display controller 20 causes the display unit 22 to display the screen generated in the processor 16. FIG. 6 shows a screen displayed on the display unit 22 and, in particular, a window showing functions related to "function-A". In the illustrated example, "function-A" is selected. UI elements corresponding to "functions 1"~"function 5" one step lower in the hierarchy, and "function 1-1"~"function 5-2" two steps lower in the hierarchy are displayed. For example, a UI element may be a menu, button, radio button, text field, slider, check bock, or the like and is a particular area in the screen subject to user operation for retrieval of a particular function. A UI element may be referred to as a UI component or a UI part. When the processor 16 generates a window related to "function-A" in response to a user operation received by the receiver 12, the processor 16 refers to the version information shown in FIG. 2 to acquire the update flats for the respective functions. The processor 16 sets the first mode for "function 1", "function 1-1", etc. for which the update flag "0" is set. Further, the processor 16 uses the correspondence between the display modes and the update flags shown in FIG. 4 to set the second mode different from the first mode for "function 2-2", etc. for which any of the update flags "1"~"3" is set. More specifically, the display modes A, B, and C are set. As a result, the names of the functions lower in the hierarchy than "function-A" are displayed in a distinctive mode so that added or changed functions can be identified. Distinctive mode of display may be 3D effect (effect to make 3D depth felt) as well as highlighting, increased font size, flashing, etc. as described above.

Figure 7:
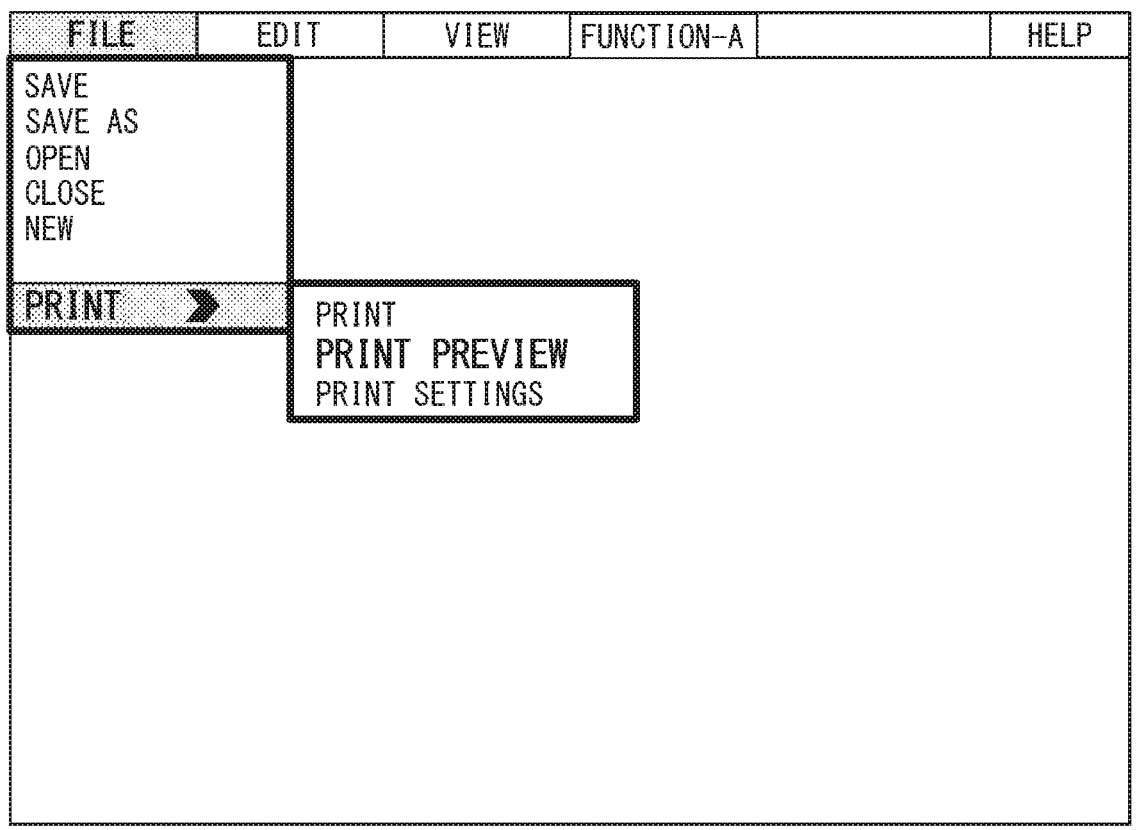
FIG. 7 shows an alternative screen displayed on the display unit.
Figure 8:
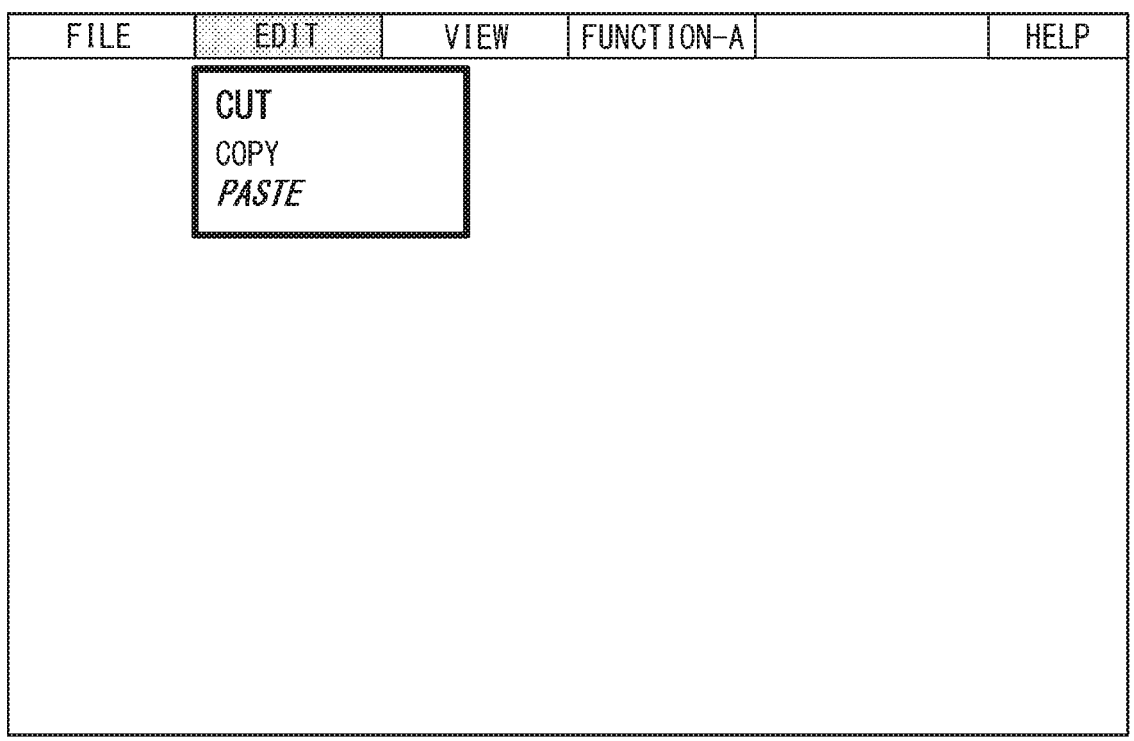
FIG. 8 shows an alternative screen displayed on the display unit.

FIG. 7 shows an alternative screen displayed on the display unit 22, and, in particular, a menu. When the processor 16 generates a menu in response to a user operation received by the receiver 12, the processor 16 refers to the version information shown in FIG. 2 to acquire the update flats for the respective functions. The processor 16 sets the first mode for "Printer Settings" etc. for which the update flag "0" is set. Further, the processor 16 uses the correspondence between the display modes and the update flags shown in FIG. 4 to set the second mode different from the first mode for "Print Preview", etc. for which any of the update flags "1"~"3" is set. More specifically, the display modes A, B, and C are set. As a result, the names of the functions in the menu are displayed in a distinctive mode so that added or changed functions can be identified. FIG. 8 shows an alternative screen displayed on the display unit 22. The figure shows a case where Edit is selected and is generated as in the case of FIG. 7. Reference is made back to FIG. 1.

Thus, the distinctive mode of display is used in the screen displayed on the display unit 22. There is also provided a feature for canceling the distinctive mode of display function by function to allow for a case where the distinctive mode of display is not necessary. As shown in FIG. 4, the cancellation conditions are set for the respective update flags. If the changed or added function meets a cancellation condition, the processor 16 generates a screen so that the changed or added function is displayed in the first mode. The cancellation condition is configured by the user as in the case of the display modes.

FIG. 9 shows an input screen for configuring cancellation conditions displayed on the display unit 22. In the input screen, a plurality of cancellation settings are arranged for each cancellation condition. The user uses the user operation unit 10 to check a check box mapped to to a cancellation setting. This causes the receiver 12 to receive cancellation settings for respective cancellation conditions from the user via the user operation unit 10. Whether to cancel the distinctive mode of display when the cancellation condition is met is indicated in "To be Cancelled". The number of times that the program is started is set in "Number of Times of Start". A counter is provided and the processor 16 increments the count every time the program is started. When the program is started a predetermined number of time (e.g., 5 times), the processor 16 cancels distinctive mode of display. The number of times that the subject function is referred to (the number of times that the function is called, number of times that the function is used) is set in "Number of Times of Reference". A counter is provided and the processor 16 increments the count every time the subject function is referred to. When the function is referred to a predetermined number of times (e.g., 5 times), the processor 16 cancels the distinctive mode of display. The number of days elapsed since the new program was first started is set in "Elapsed Days". A counter is provided and the processor 16 cancels the distinctive mode of display when a predetermined period (e.g., 30 days) has elapsed since the program was first started. The correspondence between the cancellation conditions and the cancellation settings like this is also stored in the display mode storage 34.

A plurality of cancellation settings may be designated for a single cancellation condition. In this process, the user may select whether to "AND" or "OR" a plurality of cancellation settings (not shown in FIG. 9). For example, cancellation settings "Number of Times of Start=10 OR Number of Times of Reference=5 OR Elapsed Days=60 days" may be set for the cancellation condition "α".

Further examples of the setting of the update flag and the display mode will be described. The following description concerns displaying of a menu. Exemplary version information stored in the version information storage 32 is shown in FIG. 3. Since the update flag for Print Review is set to "1", the update flag for Print higher in the hierarchy than Print Review is also set to "1". Where a function(s) is placed in each of a plurality of hierarchical levels, the update flags may be set in a manner different from that of FIG. 3. Variations 1 through 3 will be described below as display modes in which the update flag is set only for a function on the lower hierarchical level.

(Variation 1)

The update flag on a higher hierarchical level is determined in accordance with the update flag on a lower hierarchical level. For example, the highest priority is given to the update flag "1", the second highest priority is given to the update flag "2", and the third highest priority is given to the update flag "3" and the update flag on the lower hierarchical level is reflected in the update flag on the higher hierarchical level. In other words, priority is set in accordance with the type of the update flag. In this case, the higher the likelihood that the user does not know the function, or the longer the time or the more the steps required for the user to learn the method of using the function, the higher the priority assigned. For example, "1: added function" indicates a function that was not found in the old version at all so that the likelihood that the user does not know the function is high so that the highest priority is assigned. "2: changed function" indicates a function that is correspondingly found in the old version but has changed its details. It is predicted that a certain time will be required for the user to learn the method of using the function so that the second highest priority is assigned. "3: changed name" indicates a function a function substantially identically found in the old version except that its name is changed. It is predicted that the user will be able to learn the method of using the function without requiring much time so that the lowest priority is assigned.

If the update flag is "1" for one or more functions on the lower hierarchical level, the update flag for the function on the higher hierarchical level is set to "1". If there are no functions on the lower hierarchical level for which the update flag is set to "1", the update flag for the function on the higher hierarchical level is set to "2" if there are one or more functions on the lower hierarchical level for which the update flag is set to "2". If there are no functions on the lower hierarchical level for which the update flag is set to "1" or "2", the update flag for the function on the higher hierarchical level is set to "3" if there are one or more functions on the lower hierarchical level for which the update flag is set to "3". In other words, the update flag for the function on the lower hierarchical level is reflected in the update flag for the function on the higher hierarchical level, based on the order of priority of the update flags on the lower hierarchical level. Even if the update flag on a given higher hierarchical level is set to "0", the update flag on that higher hierarchical level may be reset to a value other than "0" provided that the update flag on the lower hierarchical level is set to a value other than "0".

If the lower hierarchical level only includes functions that are displayed in the first mode, the processor 16 generates a screen such that the function on the higher hierarchical level is displayed in the first mode. Meanwhile, if at least one function displayed in one of the display modes A~C is included in a lower hierarchical level, the processor 16 generates a screen such that the function on the higher hierarchical level is displayed in the mode identical to that of one of the functions included.

(Variation 2)

As in variation 1, the highest priority is given to the update flag "1", the second highest priority is given to the update flag "2", and the third highest priority is given to the update flag "3". In this variation, the display mode of the function on the higher hierarchical level is changed in accordance with the number of functions, among the functions included in the lower hierarchical level, with the update flag of the highest priority.

Figure 10A:
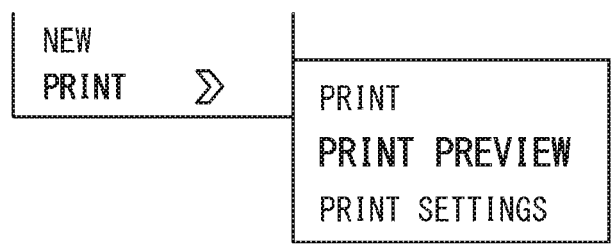
FIGS. 10A and 10B show further exemplary screens displayed on the display unit.
Figure 10B:
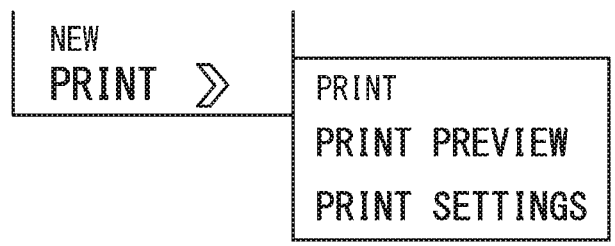

FIGS. 10A-10B show further exemplary screens displayed on the display unit 22. FIG. 10A shows a case where "Print Preview" is the only function with the update flag "1" included in the lower hierarchical level. In this case, "Print", which is the function higher in the hierarchy than "Print Preview", is also displayed in the same mode as "Print Preview". More specification, "Print" and "Print Preview" are displayed in the display mode A.

FIG. 10B shows a case where the update flag "1" is set for two functions "Print Preview" and "Printer Settings" included in the lower hierarchical level. In this case, "Print", which is the function higher in the hierarchy, is displayed in a mode with a larger and bolder character than the functions on the lower hierarchical level. More specifically, "Print Preview" and "Printer Settings" are displayed in the display mode A, and "Print" is displayed in a bolder and larger character than those of the display mode A. In essence, if at least one of the functions displayed in any of the display modes A~C is included in the lower hierarchical level, the processor 16 generates a screen such that the function higher in the hierarchy is displayed in a display mode that is changed depending on the number of those functions. The number of update flags included in the lower hierarchical level may be displayed as a numeral in the UL element on the higher hierarchical level. If there are two update flags on the hierarchical level lower than "Print", the menu item "Print" may be displayed to read "Print (2)", for example. The display color of the numeral may be changed depending on the type of the update flag on the lower hierarchical level. For example, if there are two update flags "1", the numeral "2" may be displayed in red. If there are two update flags "2", the numeral "2" may be displayed in blue. If there is one update flag "1" and one update flag "2", the numeral "2" may be displayed in purple.

(Variation 3)

In this variation, the update flag is displayed in bits. For example, the update flags for the function on the lower hierarchical level are denoted by, for example, "000: no change", "001: added function", "010: changed function"; and "100: changed name". The update flag for the function on the higher hierarchical level is denoted by a logical sum of the update flags for the functions on the lower hierarchical level. In a case where the function with the update flag "001" and the function with the update flag "010" are included in the lower hierarchical level, the update flag for the function on the higher hierarchical level is set to "011".

Figure 11A:
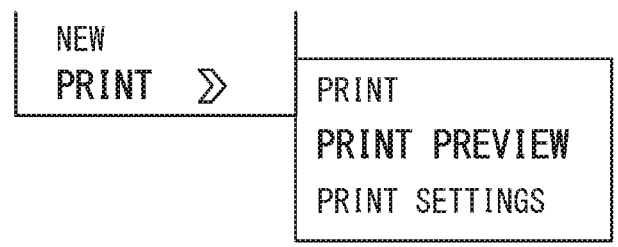
FIGS. 11A and 11B show still further exemplary screens displayed on the display unit.
Figure 11B:
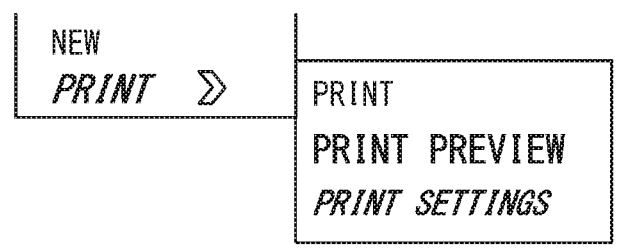

FIGS. 11A-11B show still further exemplary screens displayed on the display unit 22. FIG. 11A is identical to FIG. 10A. In this case, only one function with the update flag "001" is included in the lower hierarchical level so that the update flag for the function on the higher hierarchical level will also be "001". Therefore, "Print" and "Print Preview" are displayed in the same display mode A. FIG. 11B shows a case where "Print Preview" with the update flag "001" and "Printer Settings" with the update flag "010" are included in the lower hierarchical level. In this case, the update flag for "Print", which is the function higher in the hierarchy, will be "011". Further, "Print" is displayed in a mode derived from synthesizing the display mode A corresponding to the update flag "001" and the display mode B corresponding to the update flag "010". In essence, if a plurality of functions with mutually different update flags are included in the lower hierarchical level, the processor 16 generates a screen such that the function on the higher hierarchical level is displayed in a mode derived from synthesizing the modes corresponding to the flags. As regards the color such as character color and background color, the mode derived from synthesizing a plurality of display modes may be determined according to a predetermined rule. For example, the color may be determined based on a rule such as "use a color produced by mixing a plurality of colors" or "use a color having the highest intensity among the plurality of colors".

The features are implemented in hardware such as a CPU, a memory, or other LSI's, of any computer and in software such as a program loaded into a memory. The figure depicts functional blocks implemented by the cooperation of these elements. Therefore, it will be obvious to those skilled in the art that the functional blocks may be implemented in a variety of manners by hardware only, software only, or by a combination of hardware and software.

Figure 12:
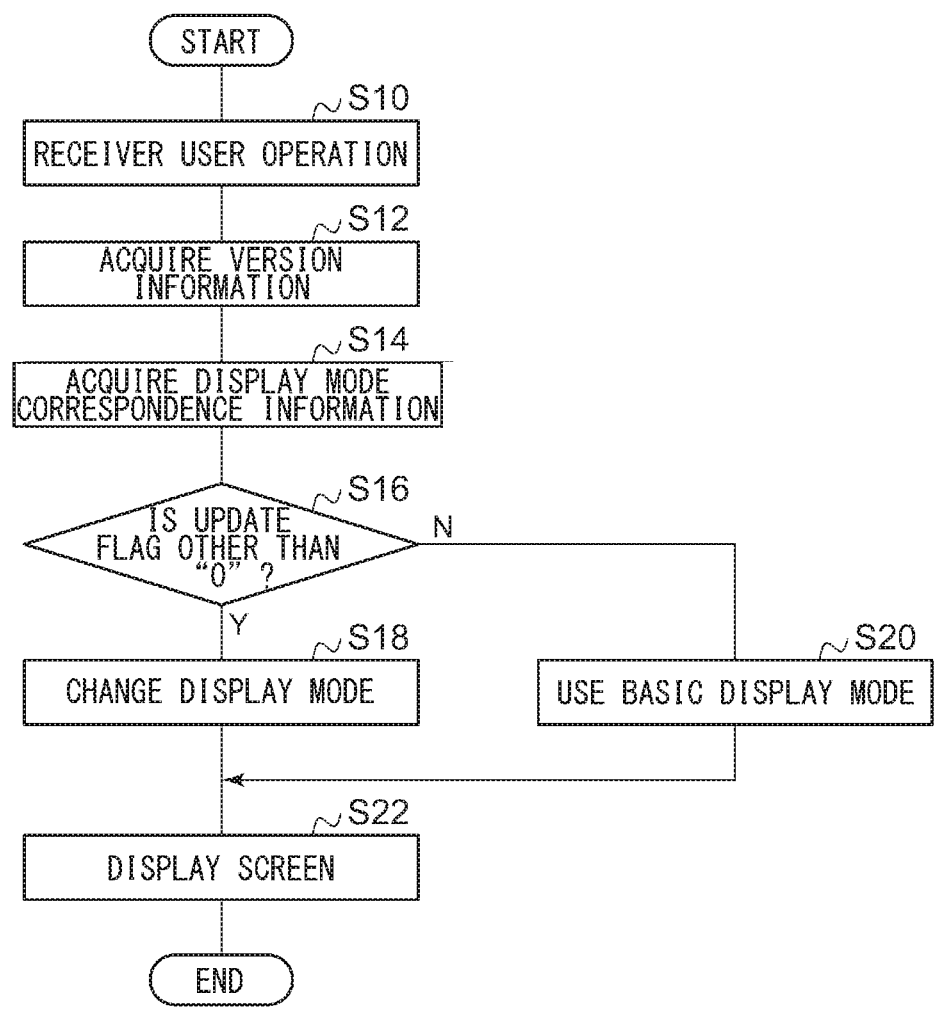
FIG. 12 is a flowchart showing the displaying steps performed by the information processing device.

A description will now be given of the operation of the information processing device 100 having the configuration described above. FIG. 12 is a flowchart showing the displaying steps performed by the information processing device 100. The receiver 12 receives a user operation (S10). For example, a new program stored in the program storage 30 is started in response to a predetermined user operation, and the process is started. The processor 16 acquires version information from the version information storage 32 (S12). The processor 16 acquires the display mode correspondence information from the display mode storage 34 (S14). The processor 16 determines the update flags corresponding to the respective functions displayed in the screen (S16). When the update flag is other than "0" (Y in S16), the processor 16 uses the display mode correspondence information to change the display mode (S18). In other words, the processor 16 determines the display mode based on the version information (update flag) and the display mode correspondence information. Meanwhile, when the update flag is not other than "0" (i.e., when the update flag is "0") (N in S16), the processor 16 uses the basic display mode (S20). The display unit 22 displays the screen (S22). As will be evident from the description of steps S12 and S14 above, the processor 16 has the function as the acquisition unit.

Figure 13:
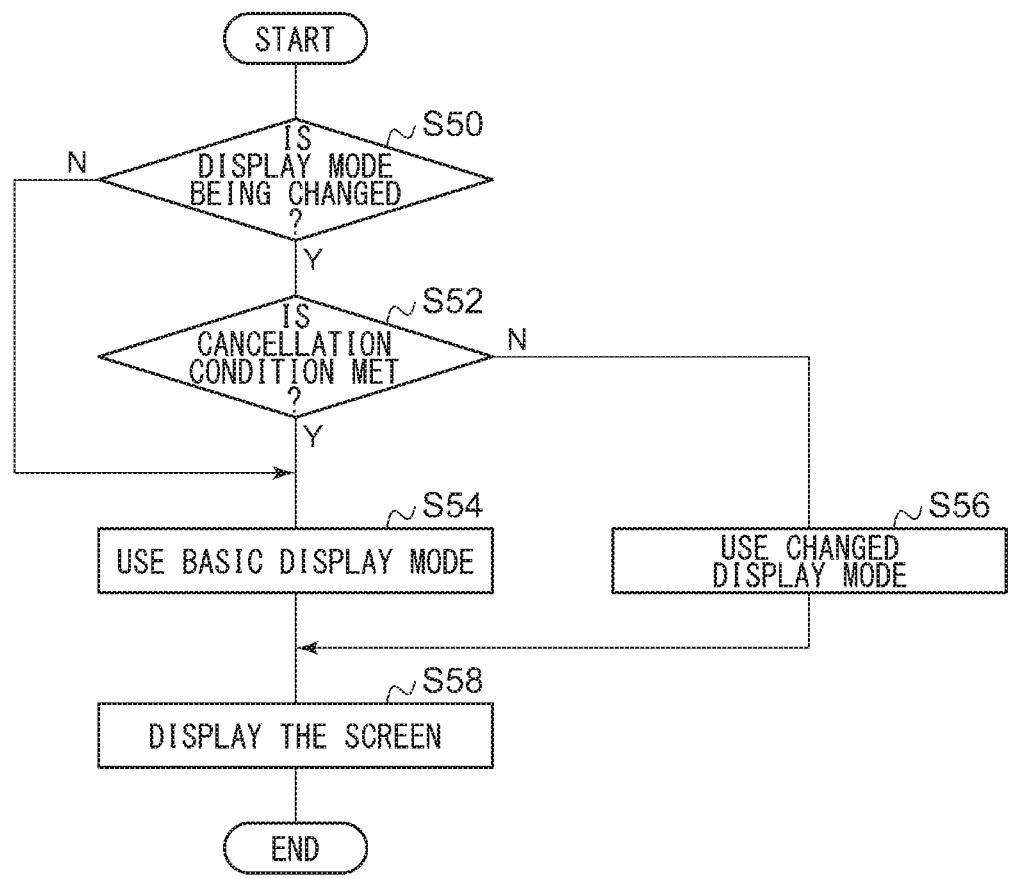
FIG. 13 is a flowchart showing the alternative displaying steps performed by the information processing device.

FIG. 13 is a flowchart showing the alternative displaying steps performed by the information processing device 100. When the display mode is being changed (Y in S50), the processor 16 uses the basic display mode (S54) if the cancellation condition is met (Y in S52). When the display mode is not being changed (N in S50), the processor 16 uses the basic display mode (S54). If the cancellation condition is not met (N in S52), the processor 16 uses the changed display mode (S56). The display unit 22 displays the screen (S58).

According to the embodiment, a screen for selecting a function is displayed such that the function identical to the pre-update version is displayed in the first display mode and the changed or added function is displayed in the second mode. Accordingly, the added or changed function can be made known easily. By displaying the functions in this way, the function added or changed as a result of updating the program version can be made known to the user clearly. Since the function added or changed as a result of updating the program version can be made known to the user clearly, the user can know a new function easily and learn the method of using the function efficiently. Since the settings for the respective display modes are received from the user and the correspondence between the settings and the display modes is used to display the functions. Therefore, the display modes can be flexibly configured according to the user's intent. Since the added function and the changed function are displayed in different modes, the detail of change can be made known to the user.

In the related art, a window of an old version (guide window) is displayed in addition to a window of a new program so that the user is required to compare the two windows visually and recognize a difference between the windows. The guide window is, however, a window not relevant to the function (purpose) inherent to the program in the first place. Displaying the windows reduces the screen space for displaying functions inherent to the program and results in poor usability of the program. The scheme causes the user to compare the two windows visually and so may force the user to make numerous eye movements and extra cognitive efforts.

On the other hand, the claimed invention changes the display mode for the UI element showing the function inherent to the program and so requires a small screen space. The display mode for the UI element itself subject to the user operation is changed in order to run the function inherent to the program. Therefore, fewer eye movements are required and cognitive efforts of visually comparing the two windows are unnecessary. For example, the user may find and click on "Print" menu to run the function of "Print", which is inherent to the program. The difference from the old version, if any, is identified merely by seeing "Print" menu so that extra eye movements or cognitive efforts are not required. Accordingly, the function newly added to the program or the changed function can be made known to the user in a manner easy to know.

In further accordance with the embodiment, the function on the higher hierarchical level is displayed in a mode identical to one of the display modes for the functions included in the lower hierarchical level. Therefore, the addition or change to the function on the lower hierarchical level can be predicted merely by seeing how the function on the higher hierarchical level is displayed. In still further accordance with the embodiment, the display mode for the function on the higher hierarchical level is changed in accordance with the number of added or changed functions included in the lower hierarchical level. Therefore, the number of additions or changes to the functions on the lower hierarchical level can be predicted merely by seeing how the function on the higher hierarchical level is displayed. In still further accordance with the embodiment, the function on the higher hierarchical level is displayed in a display mode derived from synthesizing the display modes of the added or changed functions included in the lower hierarchical level. Therefore, the addition or change to the functions on the lower hierarchical level can be predicted merely by seeing how the function on the higher hierarchical level is displayed. In still further accordance with the embodiment, the added or changed function is returned to the first mode when the added or changed function meets a predetermined cancellation condition. Therefore, the display mode can be restored when the change to the display mode is no longer necessary. This prevents the user from becoming used to the second mode displayed for a prolonged period of time and prevents the attention of the user to the second mode from being reduced.

Described above is an explanation based on an exemplary embodiment. The embodiment is intended to be illustrative only and it will be understood by those skilled in the art that various modifications to constituting elements and processes could be developed and that such modifications are also within the scope of the present invention.

In the embodiment, the version information storage 32 stores the version information received from the external server 150. Alternatively, the update flag in the version information may, for example, be edited by a user operation in the user operation unit 10. According to this variation, the update flag that suits the user's intent can be set.

The process to store the new program in the program storage 30 or the process of storing the version information in the version information storage 32 (installation process) may not necessarily be executed by the program and may be executed by another program such as an installer. The program (new program) may acquire the version information from the version information storage 32.

The information processing device 100 may not include the display unit 22, and a screen may be displayed on an external device instead.

The information processing device 100 according to the embodiment is described as displaying a GUI screen by way of example. Alternatively, the present invention is applicable to a Character User Interface (CUI) screen. For example, a list of functions (function list) such as "1: Print", "2: Print Preview", and "3: Printer Settings" is displayed in a terminal screen (command line screen). One function per one line may be displayed. Alternatively, a plurality of functions may be displayed collectively per one line. The user views a function list like this and enters a number corresponding to the function desired to be used via keyboard or the like. The function list may be displayed such that the display mode of the character string for at least one of the number corresponding to the function and the function name may be configured in accordance with the update flag. For example, if the update flag corresponding to the function is "1: added function", the character string may be displayed in "character color=red, bold". In the case of "2: changed function", "character color=yellow", and, in the case of "3: changed name", "character color=green".

What is claimed is:

1. A non-transitory computer-readable medium encoded with a program, the program comprising computer-implemented modules including:
   an acquiring module to acquire version information for each function provided in a current version of the program, the version information indicating whether the function is identical to or different from a function provided in an older version of the program than the current version;
   a generating module to generate screen data including a UI element for allowing a user to select the function provided in the current version, based on the version information; and
   a displaying module to display the generated screen data on a display, wherein:
      the screen data generated in the generation module is data for displaying a UI element corresponding to the function identical to the older version in a first display mode and displaying a UI element corresponding to the function different from the older version in a second display mode,
      the version information includes information on a hierarchical structure showing functions provided in the current version by organizing the functions in a plurality of hierarchical levels, and the generating module refers to the information on the hierarchical structure and generates, when one or more functions belonging to a lower hierarchical level are functions different from the older version, screen data for displaying a UI element corresponding to a function belonging to a higher hierarchical level in the second display mode.

2. The non-transitory computer-readable medium according to claim 1, wherein the first display mode and the second display mode of the screen data generated in the generation module are different in respect of at least one of a character size, character decoration, character color, and background color included in the UI element.

3. The non-transitory computer-readable medium according to claim 1, where the program further comprising computer-implemented modules including:

a storing module to store setting information related to at least one of a character size, character decoration, character color, and background color designated by the user, wherein the generating module determines the second display mode in accordance with the stored setting information.

4. The non-transitory computer-readable medium according to claim 1, wherein the version information includes update type information indicating, for the function different from the older version, whether the function is newly added to the older version or changed from the older version, and the generating module generates, based on the update type information, screen data for displaying, of UI elements displayed in the second display mode, a UI element corresponding to the function newly added to the older version in a third display mode and displaying a UI element corresponding to the function changed from the older version in a fourth display mode.

5. The non-transitory computer-readable medium according to claim 1, wherein the generating module refers to the information on the hierarchical structure and generates screen data for displaying information indicating the number of those of functions belonging to the lower hierarchical level that are different from the older version, in a UI element corresponding to the function belonging to the higher hierarchical level.

6. The non-transitory computer-readable medium according to claim 1, wherein the generating module refers to the information on the hierarchical structure and changes, when one or more of those functions belonging to the lower hierarchical level are different from the older version, the display mode of the UI element corresponding to the function belonging to the higher hierarchical level in accordance with the number of functions different from the older version.

7. The non-transitory computer-readable medium according to claim 1, wherein the version information includes update type information at least capable of discriminating between whether the function provided in the current version is identical to or different from the function provided in the older version and is also capable of discriminating, when the functions are different, between two or more types of states, and the generating module refers to the information on the hierarchical structure and determines a display mode of the UI display element corresponding to the function belonging to the higher hierarchical level in accordance with the update type information on the function belonging to the lower hierarchical level.

8. The non-transitory computer-readable medium according to claim 1, wherein the generating module generates screen data for displaying the UI element corresponding to the function different from the older version in the first display mode, when a cancellation condition for canceling display in the second display mode is met, and the cancellation condition is met when the program is started a predetermined number of times or more, or when the function provided in the current version is referred to a predetermined number of times or more, or when a predetermined period of time or longer elapses since the program was first started.

9. An information processing device, comprising:

a storage that stores a program;

a processor that executes the program which causes the information processing device to perform operations including:

acquiring version information for each function provided in a current version of the stored program, the version information indicating whether the function is identical to or different from a function provided in an older version of the program than the current version, and generating screen data including a UI element for allowing a user to select the function provided in the current version, based on the version information; and a display unit that displays the generated screen data on a display, wherein:

the screen data is data for displaying a UI element corresponding to the function identical to the older version in a first display mode and displaying a UI element corresponding to the function different from the older version in a second display mode, the version information includes information on a hierarchical structure showing functions provided in the current version by organizing the functions in a plurality of hierarchical levels, and referring to the information on the hierarchical structure and generating, when one or more functions belonging to a lower hierarchical level are functions different from the older version, screen data for displaying a UI element corresponding to a function belonging to a higher hierarchical level in the second display mode.

10. A display method implemented by a computer, comprising:

acquiring version information for each function provided in a current version of a program stored in the computer, the version information indicating whether the function is identical to or different from a function provided in an older version of the program than the current version;

generating screen data including a UI element for allowing a user to select the function provided in the current version, based on the version information; and displaying the generated screen data on a display, wherein:

the screen data generated in the generating is data for displaying a UI element corresponding to the function identical to the older version in a first display mode and displaying a UI element corresponding to the function different from the older version in a second display mode, the version information includes information on a hierarchical structure showing functions provided in the current version by organizing the functions in a plurality of hierarchical levels, and referring to the information on the hierarchical structure and generating, when one or more functions belonging to a lower hierarchical level are functions different from the older version, screen data for displaying a UI element corresponding to a function belonging to a higher hierarchical level in the second display mode.

* * * * *